(12) United States Patent
Kazama et al.

(10) Patent No.: US 11,343,294 B2
(45) Date of Patent: May 24, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventors: Yuji Kazama, Kanagawa (JP); Yasuhiro Ishitobi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 340 days.

(21) Appl. No.: 16/208,578

(22) Filed: Dec. 4, 2018

(65) Prior Publication Data

US 2019/0230137 A1  Jul. 25, 2019

(30) Foreign Application Priority Data

Jan. 23, 2018  (JP) .............................. JP2018-008556

(51) Int. Cl.
| | | |
|---|---|---|
| *H04L 65/403* | (2022.01) | |
| *H04L 51/046* | (2022.01) | |
| *G06Q 10/10* | (2012.01) | |
| *G06F 40/103* | (2020.01) | |
| *G06F 40/166* | (2020.01) | |

(52) U.S. Cl.
CPC .......... *H04L 65/403* (2013.01); *G06F 40/103* (2020.01); *G06F 40/166* (2020.01); *G06Q 10/101* (2013.01); *G06Q 10/103* (2013.01); *H04L 51/046* (2013.01)

(58) Field of Classification Search
None
See application file for complete search history.

(56) References Cited

U.S. PATENT DOCUMENTS

| | | | | | |
|---|---|---|---|---|---|
| 6,038,543 | A | * | 3/2000 | Kurosawa | ........ G06Q 10/06311 705/7.13 |
| 6,308,199 | B1 | * | 10/2001 | Katsurabayashi | .... G06F 3/0481 709/203 |
| 6,343,316 | B1 | * | 1/2002 | Sakata | ................... G06Q 10/10 709/213 |
| 6,959,290 | B2 | * | 10/2005 | Stefik | ................... G06Q 10/101 705/51 |
| 8,639,552 | B1 | * | 1/2014 | Chen | ................ G06Q 10/06311 705/7.21 |

(Continued)

FOREIGN PATENT DOCUMENTS

| | | |
|---|---|---|
| JP | H06274493 | 9/1994 |
| JP | 2017027427 | 2/2017 |

OTHER PUBLICATIONS

Office Action of Japan Counterpart Application, with English translation thereof, dated Nov. 30, 2021, pp. 1-3.

*Primary Examiner* — Backhean Tiv
(74) *Attorney, Agent, or Firm* — JCIPRNET

(57) ABSTRACT

An information processing apparatus includes an extraction unit that extracts a worker who participates in cooperative work and has performed work regarding remaining work along with a person in charge of the remaining work in a case where the person in charge of the remaining work in the cooperative work does not participate in the cooperative work, and a request unit that requests the worker extracted by the extraction unit to be in charge of the remaining work.

8 Claims, 10 Drawing Sheets

(56) References Cited

U.S. PATENT DOCUMENTS

| | | | |
|---|---|---|---|
| 9,514,110 B2* | 12/2016 | Kuchibhotla | G06F 40/197 |
| 9,565,246 B1* | 2/2017 | Tsypliaev | H04L 67/10 |
| 10,430,504 B1* | 10/2019 | Narayanamurthi | G06F 40/166 |
| 2002/0165898 A1* | 11/2002 | Duffy | G06Q 10/10 718/102 |
| 2004/0054566 A1* | 3/2004 | J'Maev | G06Q 10/10 705/7.23 |
| 2004/0111313 A1* | 6/2004 | Ingman | G06Q 10/1097 705/7.16 |
| 2005/0010463 A1* | 1/2005 | Du | G06Q 10/06314 705/7.15 |
| 2006/0031078 A1* | 2/2006 | Pizzinger | G06Q 10/06313 705/7.23 |
| 2006/0069599 A1* | 3/2006 | Hatoun | G06Q 10/0633 705/7.27 |
| 2006/0106661 A1* | 5/2006 | Oikawa | G06Q 10/06 705/7.13 |
| 2007/0067199 A1* | 3/2007 | Shine | G06Q 10/06312 705/7.14 |
| 2007/0208994 A1* | 9/2007 | Reddel | G06F 40/197 715/205 |
| 2008/0003559 A1* | 1/2008 | Toyama | G09B 7/02 434/350 |
| 2009/0122333 A1* | 5/2009 | Kato | G06F 3/1208 358/1.15 |
| 2009/0157459 A1* | 6/2009 | Nastacio | G06Q 10/10 705/7.13 |
| 2009/0235253 A1* | 9/2009 | Hope | G06Q 10/10 718/100 |
| 2009/0319926 A1* | 12/2009 | Chakra | G06Q 10/109 715/764 |
| 2010/0250322 A1* | 9/2010 | Norwood | G06Q 10/103 705/7.21 |
| 2011/0035679 A1* | 2/2011 | Nishitani | G06Q 10/00 715/751 |
| 2011/0055177 A1* | 3/2011 | Chakra | G06Q 10/109 707/695 |
| 2013/0024418 A1* | 1/2013 | Sitrick | G06F 40/169 707/608 |
| 2013/0060594 A1* | 3/2013 | Motoyama | G06Q 10/1097 705/7.21 |
| 2013/0111488 A1* | 5/2013 | Gatti | G06N 20/00 718/103 |
| 2013/0155071 A1* | 6/2013 | Chan | G06T 13/00 345/473 |
| 2013/0160142 A1* | 6/2013 | Lai | G06F 21/6209 726/28 |
| 2013/0185657 A1* | 7/2013 | Gunawardena | G06F 40/169 715/753 |
| 2014/0082473 A1* | 3/2014 | Sitrick | G06Q 10/101 715/230 |
| 2014/0129645 A1* | 5/2014 | Mo | G06F 40/131 709/205 |
| 2014/0143672 A1* | 5/2014 | Kim | G06Q 10/101 715/733 |
| 2014/0298207 A1* | 10/2014 | Ittah | G06Q 10/00 715/753 |
| 2015/0281149 A1* | 10/2015 | Masterson | H04L 51/02 715/752 |
| 2015/0339020 A1* | 11/2015 | D'Amore | G06F 3/0484 715/753 |
| 2015/0347971 A1* | 12/2015 | D'Amore | G06Q 10/101 705/300 |
| 2016/0140095 A1* | 5/2016 | Park | G06F 40/169 707/736 |
| 2016/0224939 A1* | 8/2016 | Chen | G06Q 10/06311 |
| 2017/0024426 A1* | 1/2017 | Kazama | G06F 40/197 |
| 2017/0180476 A1* | 6/2017 | Rudrawar | G06F 16/23 |
| 2017/0371527 A1* | 12/2017 | Morichere-Matte | G06Q 50/01 |
| 2018/0109574 A1* | 4/2018 | Vigoda | G06N 7/005 |
| 2019/0147402 A1* | 5/2019 | Sitrick | H04M 3/567 705/301 |
| 2019/0155870 A1* | 5/2019 | Prakash | G06F 40/143 |
| 2019/0230137 A1* | 7/2019 | Kazama | G06Q 10/101 |
| 2020/0349514 A1* | 11/2020 | Milvaney | G06Q 10/101 |
| 2021/0012270 A1* | 1/2021 | Lim | G06Q 10/063118 |
| 2021/0019705 A1* | 1/2021 | Yu | G06Q 10/103 |
| 2021/0097459 A1* | 4/2021 | Ishibashi | G06Q 10/06311 |

* cited by examiner

| USER ID | EDITING DATE AND TIME | DOCUMENT ID | EDITED PORTION | COOPERATIVE EDITING USER ID |
|---|---|---|---|---|
| USER A | 03/01/2017 09:30 | doc-123 | FIGURE 1 | USER B USER C |
| USER A | 03/02/2017 17:00 | doc-123 | FIGURE 2 | USER B |

FIG. 10

| REMAINING WORK ID | PERSON-IN-CHARGE ID | WORK CONTENT | STATE |
|---|---|---|---|
| W-001 | USER A | REPLACE FIGURE 1 WITH LATEST VERSION | UNCOMPLETED |
| W-002 | USER A | REFLECT MATTER POINTED OUT BY DIRECTOR IN FIGURE 2 | UNCOMPLETED |

FIG. 11

| USER ID | CONNECTION STATE | USAGE APPARATUS | CONNECTION SOURCE |
|---|---|---|---|
| USER A | NOT CONNECTED | N/A | N/A |
| USER B | CONNECTED | DESKTOP PC | BASE B |
| USER C | CONNECTED | SMART PHONE | BASE C |
| USER D | CONNECTED | DESKTOP PC | BASE A |

FIG. 13
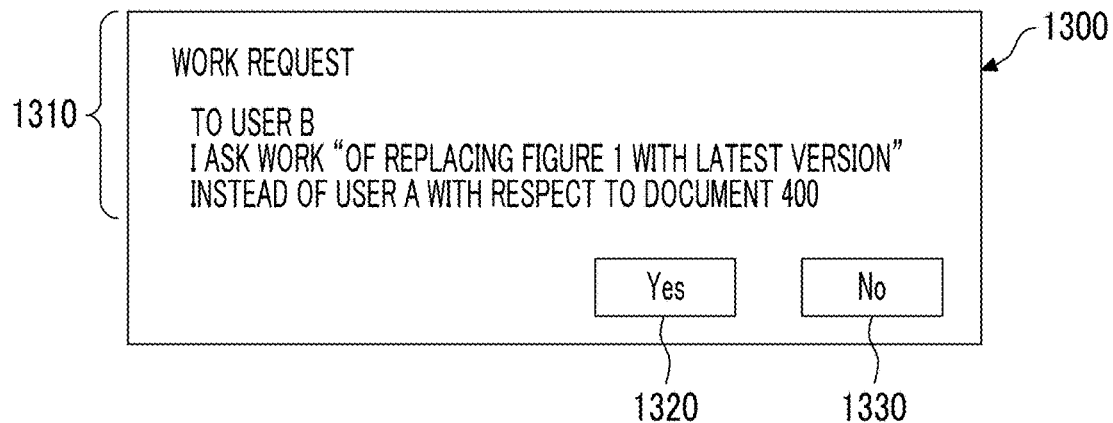
FIG. 14
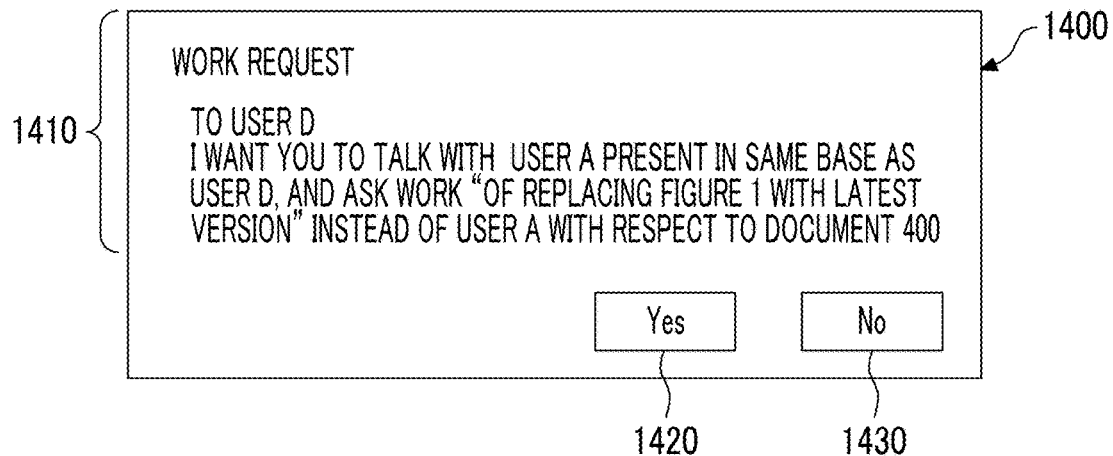
FIG. 15
| USER | DATE AND TIME | LOCATION | PLAN |
|---|---|---|---|
| USER A | 07/31/2017 10:00 TO 12:00 | OFFICE X | BUSINESS TRIP |

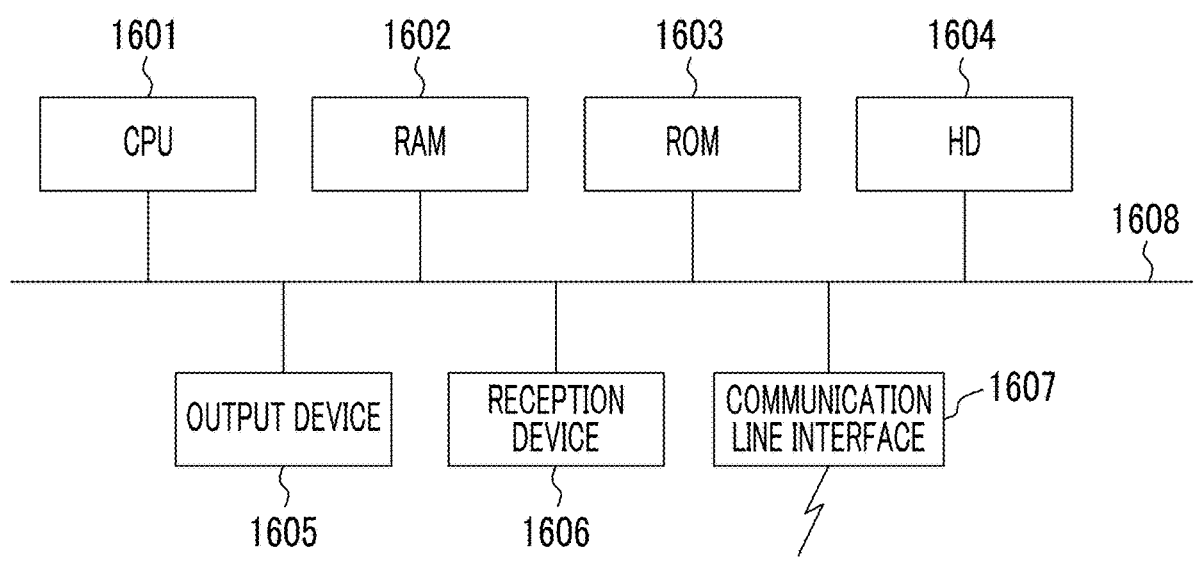

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2018-008556 filed Jan. 23, 2018.

BACKGROUND

(i) Technical Field

The present invention relates to an information processing apparatus and a non-transitory computer readable medium storing an information processing program.

(ii) Related Art

JP2017-027427A discloses a technique in which, in order to provide an information processing apparatus capable of making it hard for a user to fail to notice that editing has been performed by another user as compared with uniform notification of all editing contents, an acquisition unit of an information processing apparatus acquires history information at least including information for specifying an element of a document having been edited and information for specifying a user who has edited the element with respect to the document edited by a plurality of users; and in a case where a second user among the plurality of users edits the element of the document after a first user edits the element of the document, a notification unit notifies the first user that the element of the document has been edited in a display aspect corresponding to importance by the first user.

JP1994-274493A discloses a technique in which, in order to achieve efficient reading work even in a case where a plurality of review members are discrete in place, and to facilitate communication between the review members or the access management of comment data, in a document management apparatus in which the reading work of a document is operated, a plurality of document review processors are connected to each other via a network, and each processor is equipped with a review member management unit which performs the access management from the review members to the comment data every review target document, a comment preparing unit which is used for a reader to input a comment, an answer preparing unit which is used for an answerer to make a response to the comment, a comment retrieval unit which retrieves only the necessary comment, a comment display unit which arranges and displays the retrieved results, a comment management unit which manages the comment and response data created by the plurality of readers or answerers, and displays and prints the reviewed results, and a review notification unit which manages transmission of various kinds of notification documents for performing work adjustment between the review members.

SUMMARY

There is a cooperative work system for carrying outwork through cooperative work. There is a case where, although there is remaining work, a person in charge of the remaining work does not perform the work. In this case, anyone of cooperative workers may be requested to perform the remaining work. However, it is hard to determine an appropriate work to be requested to perform the remaining work.

Aspects of non-limiting embodiments of the present disclosure relate to an information processing apparatus and a non-transitory computer readable medium storing an information processing program capable of requesting another worker who knows remaining work to be in charge of the remaining work in a case where a person in charge of the remaining work in cooperative work does not participate in the cooperative work.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including an extraction unit that extracts a worker who participates in cooperative work and has performed work regarding remaining work along with a person in charge of the remaining work in a case where the person in charge of the remaining work in the cooperative work does not participate in the cooperative work; and a request unit that requests the worker extracted by the extraction unit to be in charge of the remaining work.

BRIEF DESCRIPTION OF THE DRAWINGS

Exemplary embodiment(s) of the present invention will be described in detail based on the following figures, wherein:

FIG. 10 is a diagram illustrating a data structure example of a remaining work table;

FIG. 11 is a diagram illustrating a data structure example of a connection state table;

FIG. 13 is a diagram illustrating a process example according to the present exemplary embodiment;

FIG. 14 is a diagram illustrating a process example according to the present exemplary embodiment;

FIG. 15 is a diagram illustrating a data structure example of a schedule table; and FIG. 16 is a block diagram illustrating a hardware configuration example of a computer realizing the present exemplary embodiment.

DETAILED DESCRIPTION

Hereinafter, with reference to the drawings, a description will be made of an exemplary embodiment for realizing the invention.

Figure 1:
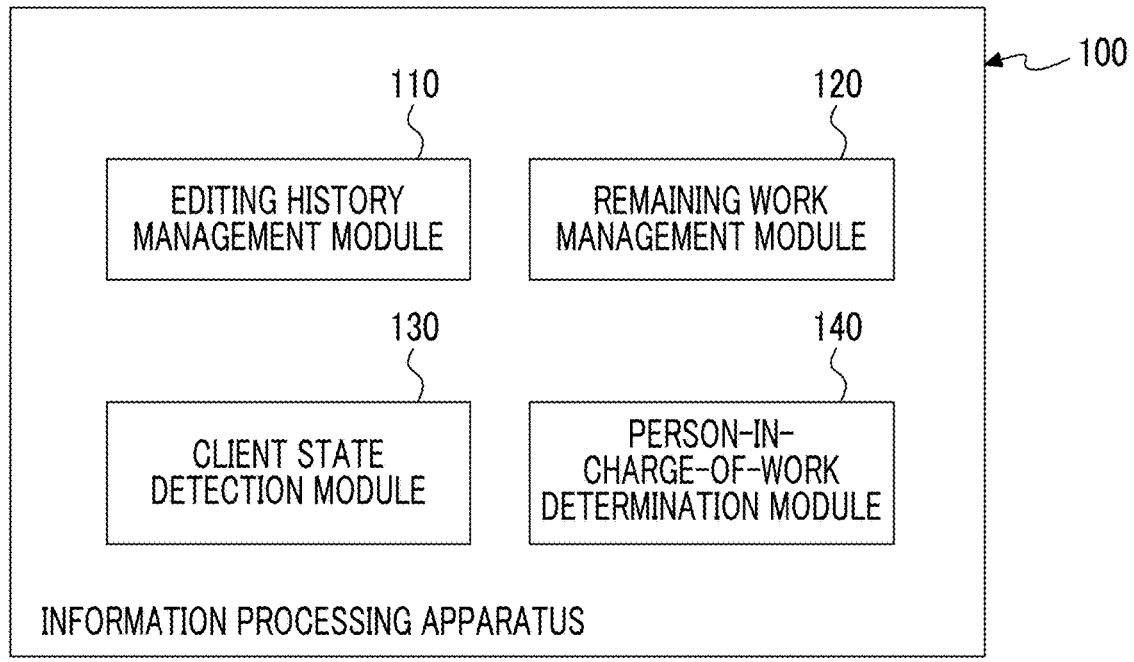
FIG. 1 is a conceptual module configuration diagram illustrating a configuration example according to the present exemplary embodiment.

FIG. 1 is a conceptual module configuration diagram illustrating a configuration example according to the present exemplary embodiment.

The module generally indicates components such as software (computer program) or hardware which can be logically divided. Therefore, the module in the present exemplary embodiment indicates not only a module in a computer program but also a module in a hardware configuration. Therefore, in the present exemplary embodiment, a description will also be made of a computer program (a program causing a computer to execute each procedure, a program causing a computer to each unit, or a program a computer to realize each function), a system, and a method for functioning as such a module. However, for convenience of description, "storing", "being stored", or words equivalent thereto are used, but, these words indicate that a storage device stores data or a storage device is controlled to store data in a case where an exemplary embodiment is a computer program. A module may correspond to a function on a one-to-one basis, and, in installation, a single module may be configured with a single program, a plurality of modules may be configured with a single program, and, conversely, a single module may be configured with a plurality of programs. A plurality of modules may be executed by a single computer, and a single module may be executed by a plurality of computers in a distributed or parallel environment. Other modules may be included in a single module. Hereinafter, the term "connection" indicates only physical connection but also logical connection (transmission and reception of data, indication, a reference relationship between pieces of data, login, and the like). The term "setting in advance" indicates that setting is performed prior to a target process, and indicates not only that setting is performed before a process according to the present exemplary embodiment is started but also that, even after a process according to the present exemplary embodiment is started, setting is performed depending on a situation or a state at the time or a situation or a state hitherto in a case where a target process is not performed. In a case where there are "a plurality of preset values", the values may be different from each other, and two or more values may be the same as each other (of course, including all of the values). The description that "in a case of A, B is performed" indicates that "it is determined whether or not A is satisfied, and, in a case where it is determined that A is satisfied, B is performed". However, this excludes a case where determination of whether or not A is satisfied is unnecessary. In a case where objects are listed such as "A, B, and C", the objects are exemplarily listed unless otherwise mentioned, and a case where only one thereof (for example, only A) is selected is included.

A system or an apparatus also includes not only a case where a plurality of computers, pieces of hardware, and apparatuses are configured to be connected to each other via a communication unit such as a network (including communication connection on a one-to-one basis) but also a case of being configured with a single computer, a single piece of hardware, and a single apparatus. The "apparatus" and the "system" are used as terms having an identical meaning. Of course, the "system" does not include systems that are merely a social "mechanism" (social system) which is an artificial arrangement.

Target information is read from a storage device, the process is performed, and a process result is written to the storage device for each process performed by each module or for each process in a case where a plurality of processes are performed in a module. Therefore, description of reading for a storage device before a process and writing for the storage device after the process will be omitted. The storage device here may include a hard disk, a random access memory (RAM), an external storage medium, a storage device connected via a communication line, a register in a central processing unit (CPU), or the like.

An information processing apparatus 100 according to the present exemplary embodiment is applied to a cooperative work system enabling work to be performed through cooperative work of a plurality of persons in charge, particularly, performs a process of allocating and changing a person in charge, and includes, as illustrated in an example in FIG. 1, an editing history management module 110, a remaining work management module 120, a client state detection module 130, and a person-in-charge-of-work determination module 140. As an example of cooperative work, cooperative editing of a document will be described. The document (also referred to as a file) is text data, numerical value data, graphic data, image data, moving image data, audio data, or a combination thereof, refers to an object which may be exchanged in the individual unit between systems or users as a target of storage, editing, and retrieval, and includes objects similar thereto. Specifically, the document includes a document created by a document creation program (so-called word-processing software), an image read by an image reading apparatus (scanner or the like), a web page, or the like.

The present exemplary embodiment may be summarized as follows. Particularly, this description (the description in this paragraph number) is made for the purpose of better understanding of the present exemplary embodiment, and is not intended to limit the present exemplary embodiment. It is obvious that the invention to be patented is not to be determined by using only this description part with respect to the contents disclosed in the Detailed Description of the Invention.

A cooperative work system not using the information processing apparatus 100 is based on the fact that all user terminals are performing cooperative editing during cooperative editing of a document. In a case where there is remaining work in the document which is being cooperatively edited, and a person in charge of the remaining work does not perform cooperative editing, a failure to perform the remaining work may occur by the completion date of the document.

In this case, even though a work request is made to the person in charge of the remaining work in advance, it may not be said that the person in charge immediately performs the work. For example, this is because the person in charge forgets the work, or separate interrupted work may occur before the work is performed.

Even though the work is allocated to other persons in charge, it is often hard to determine a person in charge.

Therefore, in a case where the completion date of a document comes, the information processing apparatus 100 allocates work to an appropriate person in charge among current workers during cooperative editing on the basis of states (connection states, usage devices, connection bases, and the like) of cooperative editing workers or a content (editing history) of the document. As a result, a failure to perform remaining work can be prevented.

The editing history management module 110 manages an editing history regarding an editing time, an editing person, and an edited portion with respect to a document. An editing history accumulation device holding an editing history may be provided.

In other words, the editing history management module 110 may manage an editing history (an editing time, an editing person, an edited portion, a cooperative editing person, and the like) with respect to a document which is being cooperatively edited. In an electronic conference system, a history (specifically, a usage history of a message function such as a chat) such as a conversation partner during editing is also held. This history may be an example of information indicating a "cooperative editing person".

The remaining work management module 120 manages remaining work (a work content, a person in charge, a work execution situation, and the like) in document editing. A remaining work holding device holding information regarding remaining work may be provided.

In other words, the remaining work management module 120 records remaining work with respect to a document which is being cooperatively edited.

A target value such as the number of pages, the number of items, or a configuration of a chapter at the time of completion of work is defined, and remaining work is a difference between the target value and the current situation (the number of pages, the number of items, or a configuration of a chapter). In a case where a schedule (planned process) is predefined, and the current situation (current process) is delayed compared with the schedule, the delay is remaining work. A list of items (for example, replacement of OO, reflection in ΔΔ, or addition of explanation of XX) of things to do, such as an action item or a ToDo list may be prepared, and an item which is not completed among the items of things to do may be remaining work. Such a target value, planned process, or items of things to do may be prepared in advance before cooperative work is started, and may be added or changed during cooperative work. Of course, the former remaining work and the latter remaining work may be inclusively remaining work.

The client state detection module 130 understands a connection state of a user terminal 250.

In other words, the client state detection module 130 acquires connection information (whether or not connection is maintained, a usage device, a connection base, and the like) of the user terminal 250 during cooperative editing.

Specifically, the client state detection module 130 detects a connection state such as an online state in which the user terminal 250 is connected to an electronic conference system in a document management system 210, and cooperatively edits a document, or an offline state in which the user terminal 250 does not use the document management system 210, the type of device (a personal computer, a smart phone, or a tablet terminal) which is used during connection, or information regarding a base to which the device is connected. Whether or not the user terminal 250 is performing communication may be determined, and, in a case where the user terminal 250 is performing communication, such information may be acquired by inquiring about the type of device, a position of the device (a base (location) where a user is present), or the like.

The person-in-charge-of-work determination module 140 determines a person in charge appropriate to perform remaining uncompleted work in cooperation with the client state detection module 130, the remaining work management module 120, and the editing history management module 110, and prompts the person in charge to perform the remaining work.

For example, first, the person-in-charge-of-work determination module 140 prompts a person in charge to perform uncompleted remaining work in a case where the person in charge of the remaining work is currently performing cooperative editing by using process results in the remaining work management module 120 and the client state detection module 130.

The person-in-charge-of-work determination module 140 selects a new person in charge by using process results in the editing history management module 110 and the client state detection module 130 from among workers which are currently performing cooperative editing in a case where the person in charge of the uncompleted remaining work is not currently performing cooperative editing, and prompts the new person in charge to perform the remaining work. Consequently, work can be allocated to a worker which is currently performing cooperative editing, and thus it is possible to prevent a failure to perform remaining work due to forgetting of the work or interrupted work. Appropriate work sharing can be performed by taking into consideration situations of a worker, and thus it is possible to reduce a load on the worker.

Specifically, the following process is performed.

In a case where a person in charge of remaining work in cooperative work does not participate in the cooperative work, the person-in-charge-of-work determination module 140 extracts a worker who participates in the cooperative work and has performed work regarding the remaining work along with the person in charge (the person in charge of the remaining work).

The person-in-charge-of-work determination module 140 requests the extracted worker to be in charge of the remaining work.

The "case where a person in charge does not participate in cooperative work" includes, for example, a case where the person in charge does not log into a cooperative work system, a case where the person in charge does not use the user terminal 250, or a case where the user terminal 250 is not connected to a communication line.

In a case where the "cooperative work" is cooperative editing of a document, "work regarding the remaining work" is assumed to be editing of a portion corresponding to remaining work of the document. Here, the "cooperative editing" includes creation of a new document, correction of a document, and the like.

The person-in-charge-of-work determination module 140 may extract a worker who performs editing of a portion simultaneously with a person in charge of remaining work. The person-in-charge-of-work determination module 140 may extract a worker who using an apparatus appropriate to edit a document. The "apparatus appropriate to edit a document" is, for example, a personal computer (including a notebook PC), and does not include an apparatus such as a portable information terminal not appropriate to edit a document.

In a case where the person-in-charge-of-work determination module 140 requests a worker to be in charge of remaining work, but the worker rejects the request, the person-in-charge-of-work determination module 140 extracts a worker who may have a verbal meeting with a person in charge of the remaining work. The "worker who may have a verbal meeting with a person in charge of the remaining work" may be, for example, a worker positionally close to the "person in charge of the remaining work". As a specific example, the person-in-charge-of-work determination module 140 may extract a worker who is present in the same base as that of a person in charge of remaining work. The worker may be a worker who is within a predefined distance to the "person in charge of the remaining work", and may be a worker who is present on the same floor as that of the "person in charge of the remaining work".

Specifically, in a case of work with which only an original person in charge of remaining work can cope, a new person in charge is preferentially selected from among workers during cooperative editing who are present in the same base as that of the original person in charge of the remaining work, the new person in charge is notified such that the new person in charge contacts the original person in charge and performs the remaining work. A schedule of the original person in charge of the remaining work and a schedule of the new person in charge may be referred to such that a time period in which both of the two can have a verbal meeting with each other may be extracted, and the new person in charge is notified to perform the remaining work in the time period. Consequently, even work with which only an original person in charge of remaining work can cope is caused to be checked directly verbally by the person in charge, and thus it is possible to prevent a failure to perform remaining work.

The person-in-charge-of-work determination module 140 may make a request with a case where a predefined condition is satisfied as a trigger. This "predetermined condition" may be a case where a predefined number of remaining days is reached, or a case where the current process is later than a planned process. The number of remaining days may be the number of days which is allocable to remaining work in a schedule of a person in charge of the remaining work in a period up to a time limit of the remaining work. Of course, the person-in-charge-of-work determination module 140 acquires a schedule of each person in charge from a schedule management device, a calendar management device, or the like. As the "number of days which is allocable to remaining work", a time (or a total time) for which a plan is not written within work hours in a period up to a time limit of the remaining work may be extracted. The unit of the "number of days" may be year, month, day, hour, minute, second, second or less, or a combination thereof.

Figure 2:
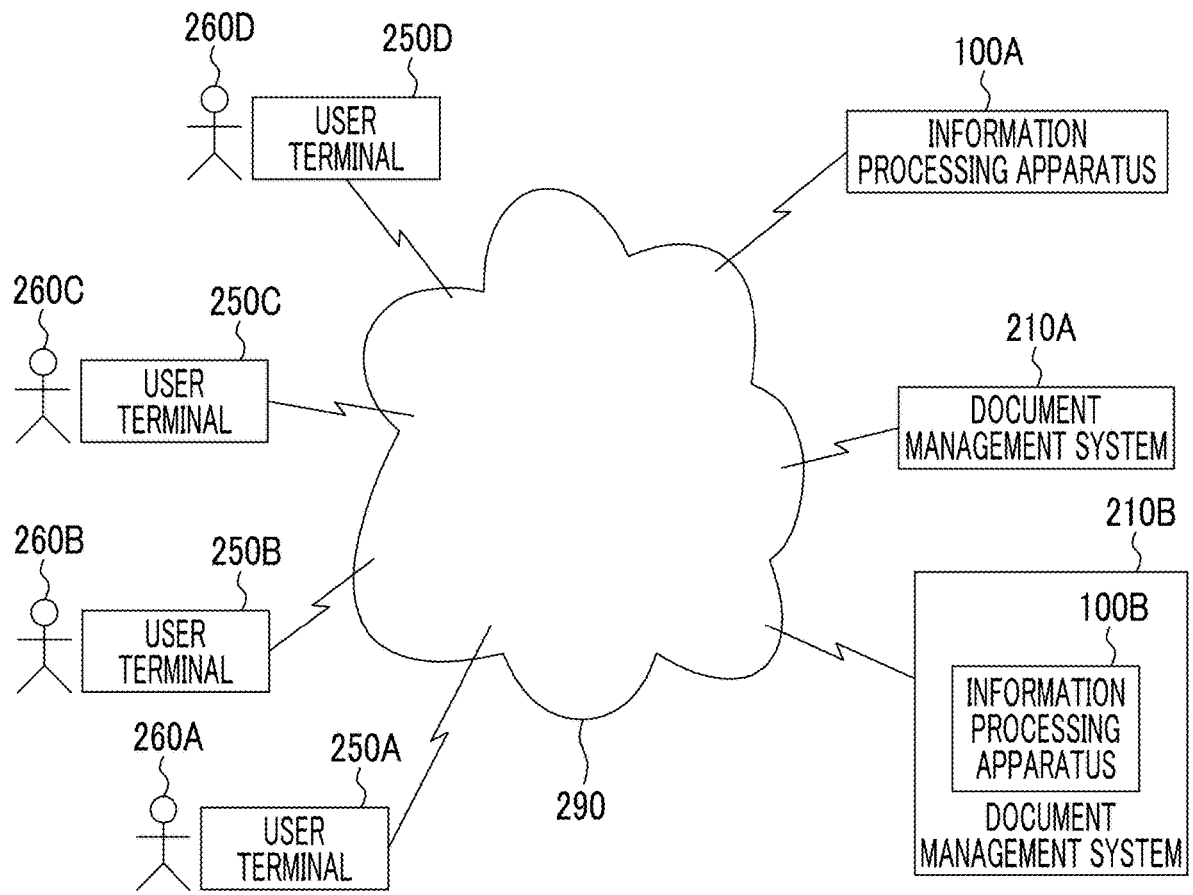
FIG. 2 is a diagram illustrating a system configuration example using the present exemplary embodiment.

FIG. 2 is a diagram illustrating a system configuration example using the present exemplary embodiment.

An information processing apparatus 100A, a document management system 210A, a document management system 210B, a user terminal 250A, a user terminal 250B, a user terminal 250C, and a user terminal 250D are connected to each other via a communication line 290. The communication line 290 may be a wireless line, a wired line, or a combination thereof, and may be, for example, the Internet or an intranet as a communication infrastructure. The document management system 210B includes the information processing apparatus 100B. The functions of the information processing apparatus 100 and the document management system 210 may be realized by a cloud service.

An electronized document may be registered in the document management system 210. The document management system 210 has a function of enabling a plurality of user terminals 250 to cooperatively edit the registered document.

An electronic conference system may be provided in the document management system 210, and an exchange may occur between the user terminals 250 during cooperative editing of a document by using means such as voices or chats.

Users 260 of the plurality of user terminals 250 form a group, and performs cooperative work. For example, a document is cooperatively edited.

The user terminal 250 may access the document management system 210, and may cooperatively edit a document in the document management system 210 in response to an operation of the user 260. In a case where the document management system 210 and the user terminal 250 are connected to each other via the communication line 290, a document may be cooperatively edited by using a web browser of the user terminal 250.

Figure 3:
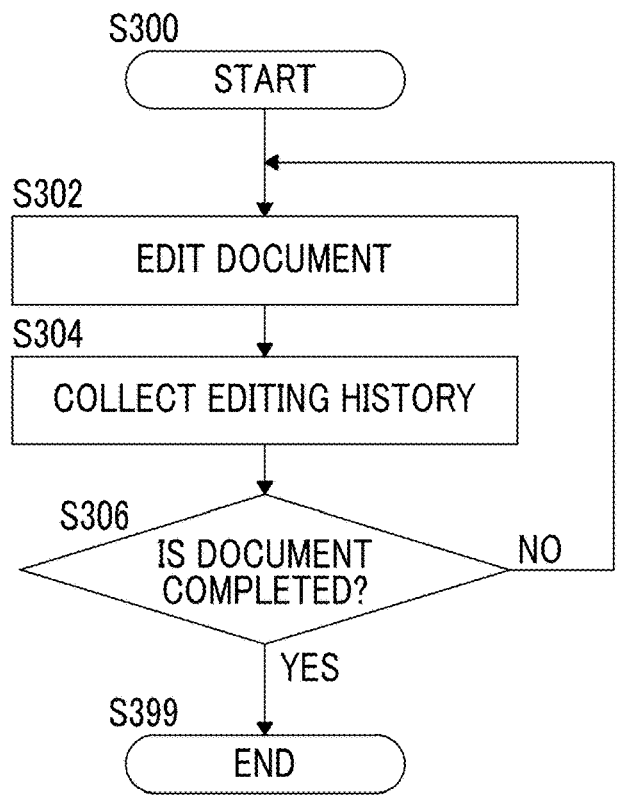
FIG. 3 is a flowchart illustrating a process example according to the present exemplary embodiment.

FIG. 3 is a flowchart illustrating a process example according to the present exemplary embodiment (document management system 210).

In step S302, a document is edited in response to an operation of each user.

Figure 4:
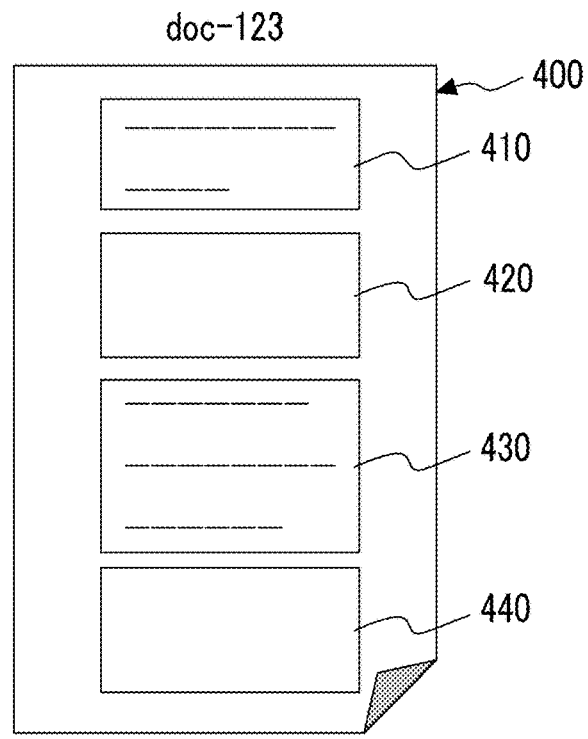
FIG. 4 is a diagram illustrating an example of a processing target according to the present exemplary embodiment.

For example, a user A, a user B, a user C, and a user D cooperatively edit a document 400 having the name "doc-123" in the document management system 210 by using the respective user terminals 250. FIG. 4 is a diagram illustrating a process target example according to the present exemplary embodiment. The document 400 has a FIG. 1: 410, a paragraph 420, a FIG. 2: 430, and a paragraph 440. Persons in charge are allocated thereto. For example, the user A is in charge of the FIG. 1: 410 and the FIG. 2: 430.

In step S304, an editing history of the document is collected.

Figures 5, 6:
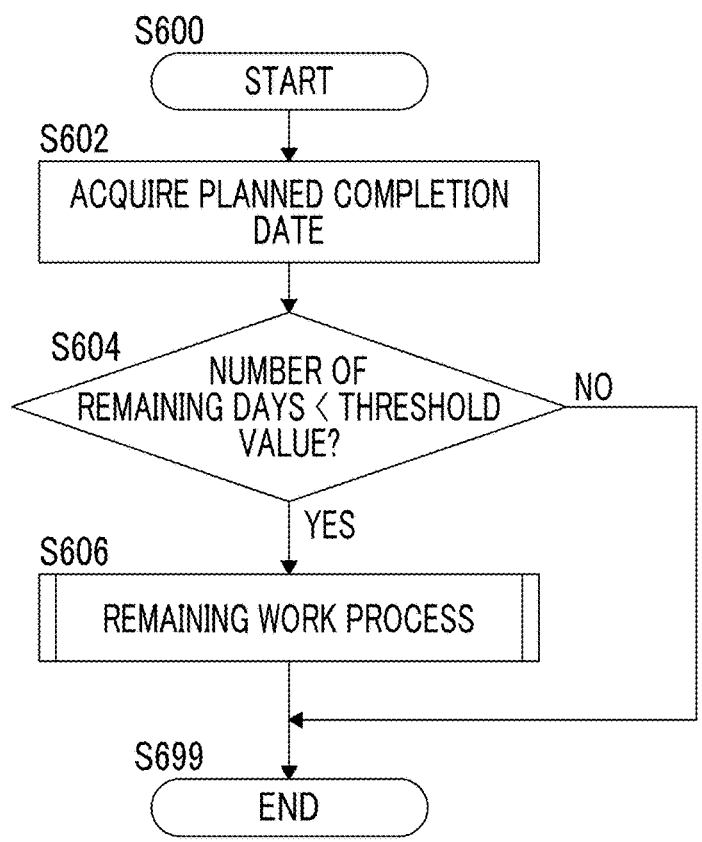
FIG. 5 is a diagram illustrating a data structure example of an editing history table.
FIG. 6 is a flowchart illustrating a process example according to the present exemplary embodiment.

The document management system 210 holds, as an editing history of the document 400 having the name "doc-123", an "editing user ID", the "editing date and time", a "document ID", an "edited portion", and a "cooperative editing user ID" in the editing history management module 110. For example, an editing history table 500 is generated in the editing history management module 110. FIG. 5 is a diagram illustrating a data structure example of the editing history table 500. The editing history table 500 has a user ID field 510, an editing date and time field 520, a document ID field 530, an edited portion field 540, and a cooperative editing user ID field 550. In the present exemplary embodiment, the user ID field 510 stores information (user identification (ID)) for uniquely identifying a user. The editing date and time field 520 stores the date and time (which may be year, month, day, hour, minute, second, second or less, or a combination thereof) at which the editing is performed. In the present exemplary embodiment, the document ID field 530 stores information (document ID) for uniquely identifying an editing target document. The edited portion field 540 stores an edited portion in the document. For example, the edited portion is the FIG. 1: 410 or the paragraph 420. The cooperative editing user ID field 550 stores user IDs of users who have performed cooperative editing on the edited portion. Here, the "users who have performed cooperative editing" may include not only persons who have simultaneously performed editing work on an identical edited portion but also persons who have performed editing work on an identical edited portion at different timings. In the example illustrated in FIG. 5, there is the record that, in addition to the user A, the user B and the user C cooperatively edited the FIG. 1: 410, and, in addition to the user A, the user B cooperatively edited the FIG. 2: 430.

The "edited portion" may be any information for uniquely identifying an edited portion in a document. For example, in a case of a structurized document, an ID for uniquely specifying an element in the structurized document corresponds to the "edited portion".

In step S306, it is determined whether or not the document is completed, and, in a case where the document is completed, the process is finished (step S399), and, in other cases, the process returns to step S302.

Figure 7:
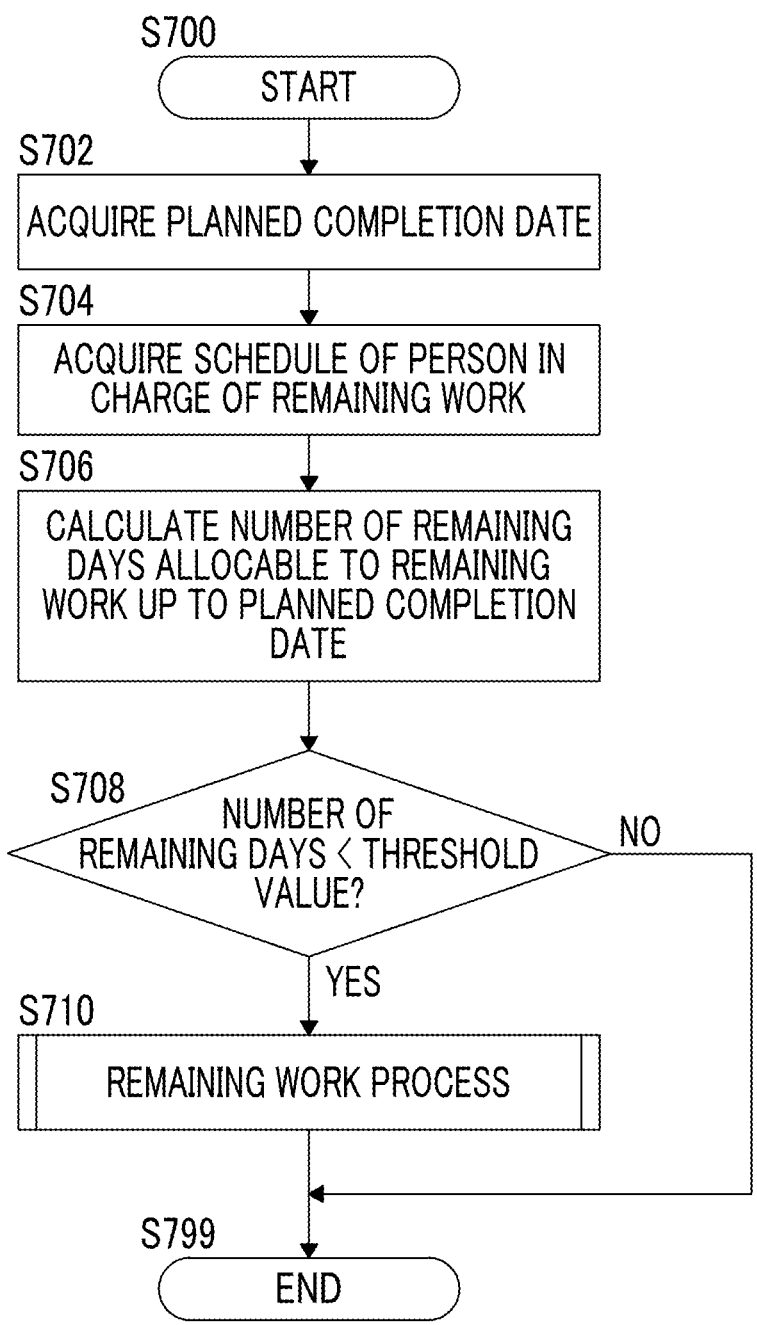
FIG. 7 is a flowchart illustrating a process example according to the present exemplary embodiment.
Figure 8:
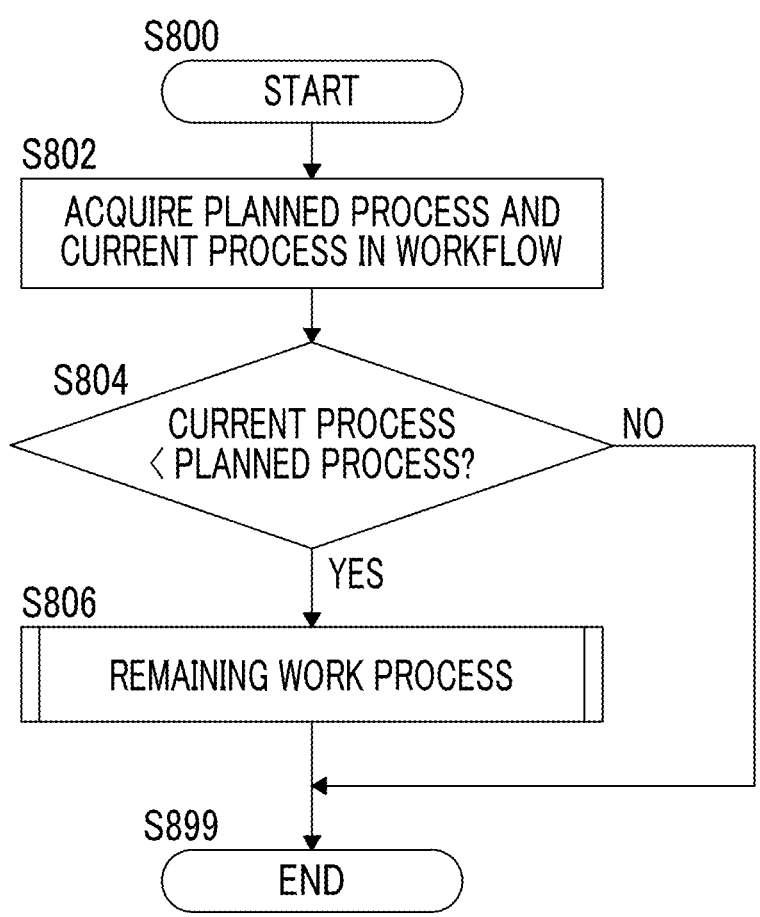
FIG. 8 is a flowchart illustrating a process example according to the present exemplary embodiment.

A process is performed according to any of the flowcharts illustrated in the examples in FIGS. 6 to 8.

FIG. 6 is a flowchart illustrating a process example according to the present exemplary embodiment.

In step S602, a planned completion date is acquired.

For example, an opening date (which may be a planned completion date) of the document 400 having the name "doc-123" is set to "Apr. 1, 2017". The document is required to be completed by the opening date.

In step S604, it is determined whether or not "the number of remaining days is less than a threshold value", and, in a case where "the number of remaining days is less than the threshold value", the process proceeds to step S606, and, in other cases, the process is finished (step S699). The number of remaining days here may be calculated on the basis of the planned completion date acquired in step S602 and the current date. The threshold value is a predefined value, and is set in the document management system 210. For example, the threshold value is set in the document management system 210 in advance such that a situation of remaining work is checked ten days before an opening date of the document.

In step S606, a remaining work process is performed. A detailed process in step S606 will be described later with reference to a flowchart illustrated in the example in FIG. 9.

FIG. 7 is a flowchart illustrating a process example according to the present exemplary embodiment.

In step S702, a planned completion date is acquired. The process is equivalent to the process in step S602 in the flowchart illustrated in the example in FIG. 6.

In step S704, a schedule of a person in charge of the remaining work is acquired.

In step S706, the number of remaining days allocable to the remaining work up to the planned completion date is calculated. As a specific example, a time obtained by subtracting a planned time other than the remaining work written in the schedule from a time (work hours) up to the planned completion date is calculated.

In step S708, it is determined whether or not "the number of remaining days is less than a threshold value", and, in a case where "the number of remaining days is less than the threshold value", the process proceeds to step S710, and, in other cases, the process is finished (step S799). The threshold value is a predefined value, and is set in the document management system 210. The threshold value is the number of days required for the remaining work, and, in a case where a person in charge of the remaining work may not secure the number of days on the schedule thereof, the process proceeds to step S710.

In step S710, a remaining work process is performed. A detailed process in step S710 will be described later with reference to a flowchart illustrated in the example in FIG. 9.

FIG. 8 is a flowchart illustrating a process example according to the present exemplary embodiment.

In step S802, a planned process (the process required to be inherently advanced at that time) in a workflow of document editing and the current process (the process at that time) are acquired.

In step S804, it is determined whether or not "the current process is later than the planned process" is established, and, in a case where "the current process is later than the planned process", the process proceeds to step S806, and, in other cases, the process is finished (step S899). In other words, in a case where the current process is later than the planned process, the process proceeds to step S806.

In step S806, a remaining work process is performed. A detailed process in step S806 will be described later with reference to a flowchart illustrated in the example in FIG. 9.

Figure 9:
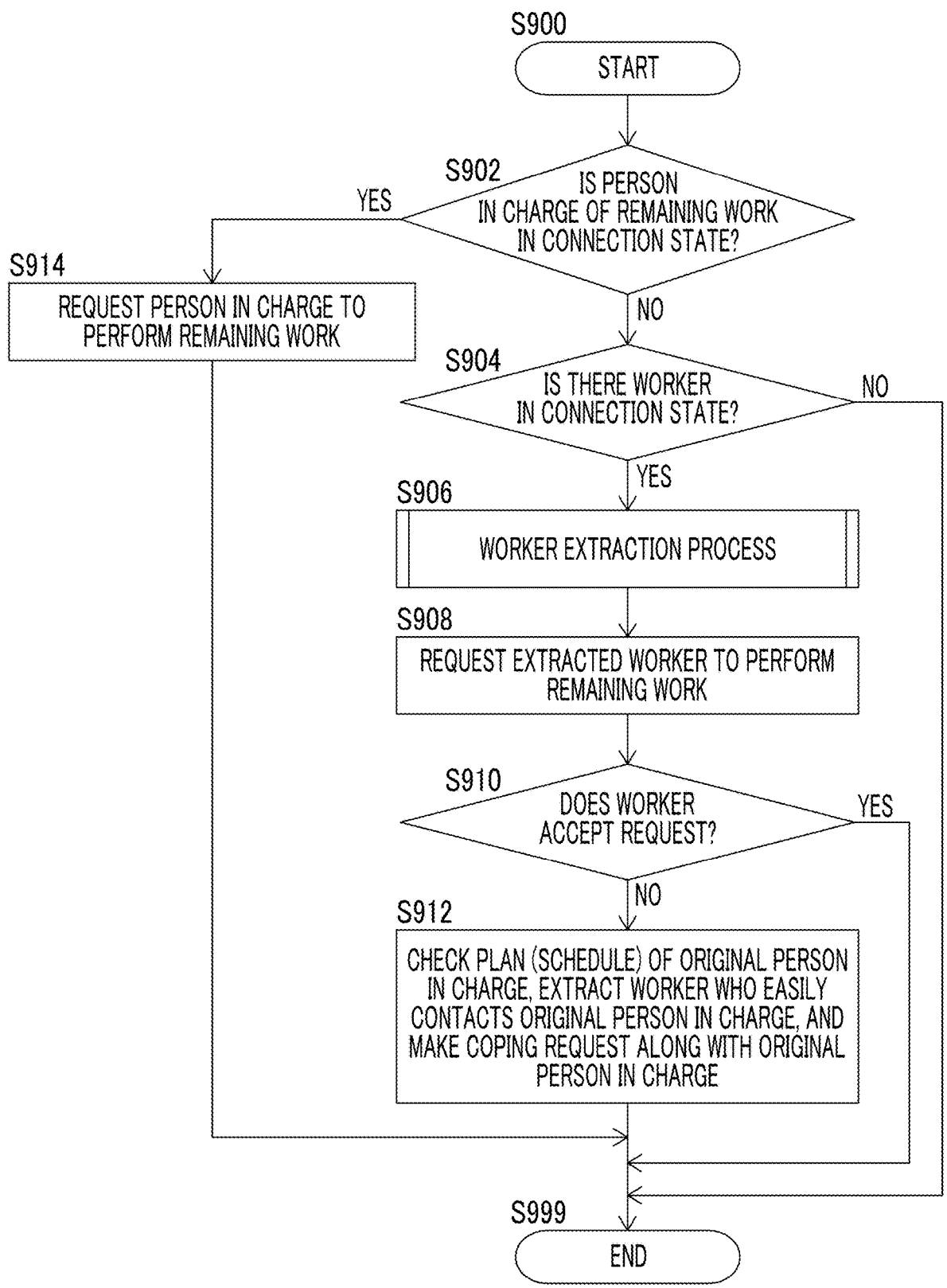
FIG. 9 is a flowchart illustrating a process example according to the present exemplary embodiment.

FIG. 9 is a flowchart illustrating a process example (step S606, step S710, or step S806) according to the present exemplary embodiment.

In step S902, it is determined whether or not the person in charge of the remaining work is in a connection state, and, in a case of the connection state, the process proceeds to step S914, and, in other cases, the process proceeds to step S904.

For example, in a case where the process proceeds from the flowcharts illustrated in the examples in FIGS. 6 to 8 (for example, ten days before an opening date of the document), uncompleted remaining work is recorded as in a remaining work table 1000 by the remaining work management module 120, and there are "W-001" and "W-002" as the uncompleted remaining work. FIG. 10 is a diagram illustrating a data structure example of the remaining work table 1000. The remaining work table 1000 has a remaining work ID field 1010, a person-in-charge ID field 1020, a work content field 1030, and a state field 1040. In the present exemplary embodiment, the remaining work ID field 1010 stores information (remaining work ID) for uniquely identifying remaining work. In the present exemplary embodiment, the person-in-charge ID field 1020 stores information (person-in-charge ID) uniquely identifying a person in charge. The work content field 1030 stores a work content in the remaining work. The state field 1040 stores a state (either completed or uncompleted) of the remaining work.

A person in charge of the remaining work "W-001" is the "user A". However, the current connection state is as in a connection state table 1100 due to a process result in the client state detection module 130. FIG. 11 is a diagram illustrating a data structure example of the connection state table 1100.

The connection state table 1100 has a user ID field 1110, a connection state field 1120, a usage apparatus field 1130, and a connection source field 1140. The user ID field 1110 stores a user ID. The connection state field 1120 stores a connection state of the user terminal 250 used by a user having the user ID. The usage apparatus field 1130 stores a usage apparatus type of the user terminal 250. The connection source field 1140 stores a base as a connection source of the user terminal 250. In this example, the user terminal 250 of the user A is not connected.

In step S904, it is determined whether or not there is a worker in a connection state, and, in a case where there is a worker in a connection state, the process proceeds to step S906, and, in other cases, the process is finished (step S999). In the example illustrated in FIG. 11, the user terminals 250 of the user B, the user C, and the user D are in a connection state, and are cooperatively editing the document 400 having the name "doc-123".

In step S906, a worker extraction process is performed. A detailed process in step S906 will be described later with reference to a flowchart illustrated in an example in FIG. 12.

In step S908, the extracted worker is requested to perform the remaining work. As a tool used for the request for performing the remaining work, for example, not only a message function provided in a cooperative work system may be used, but also an electronic mail, chats, an electronic bulletin board, a notification using social media, a push notification, calling using an automatic voice response, or the like may be used. The calling may be performed by using, for example, Lync (registered trademark).

In step S910, it is determined whether or not the worker accepts the request, and, in a case where the worker accepts the request, the process is finished (step S999), and, in other cases, the process proceeds to step S912.

In step S912, a plan (schedule) of the original person in charge is checked, a worker who easily contacts the original person in charge is extracted, and a coping request is made along with the original person in charge.

In step S914, the person in charge is requested to perform the remaining work.

Figure 12:
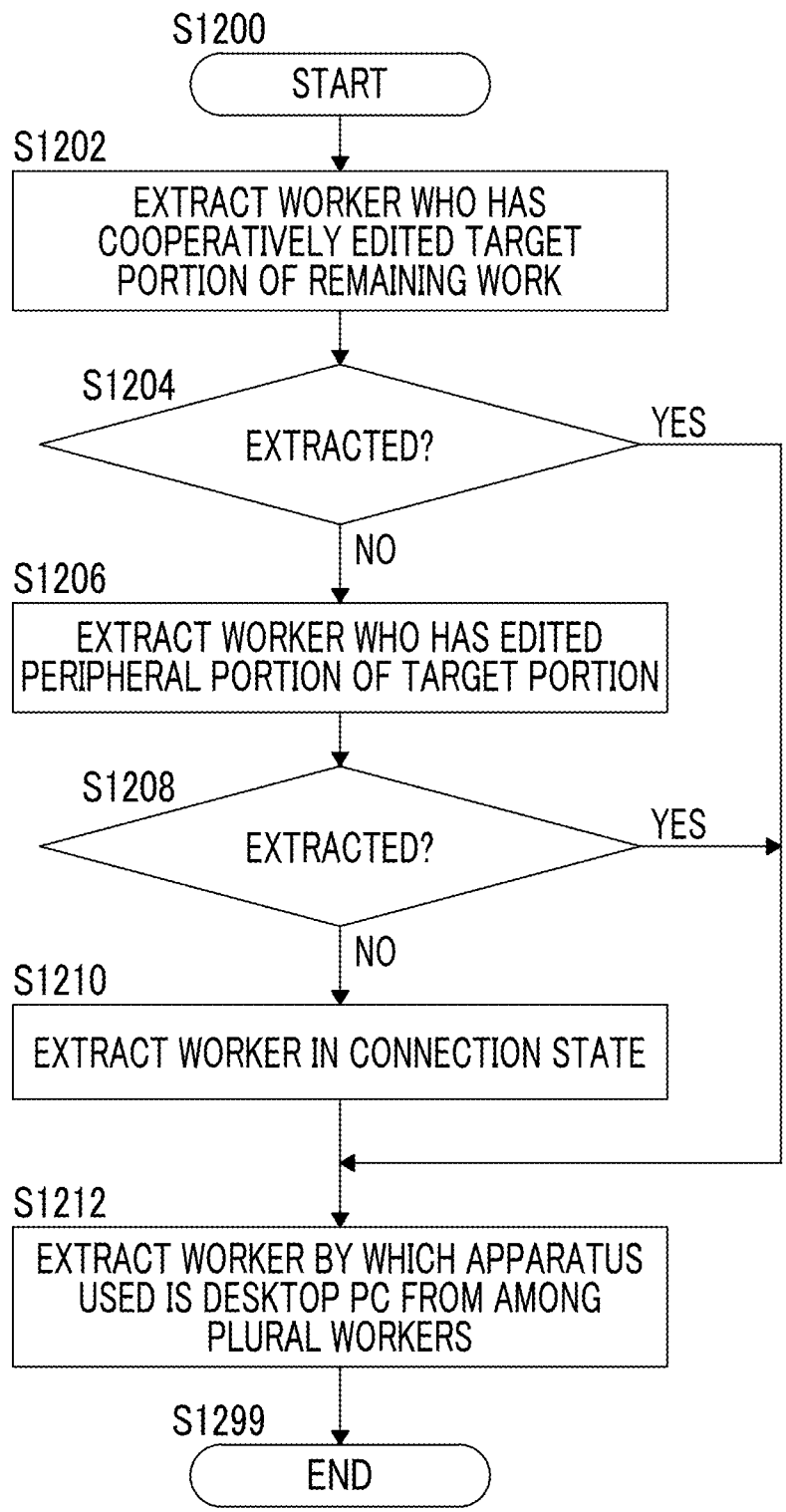
FIG. 12 is a flowchart illustrating a process example according to the present exemplary embodiment.

FIG. 12 is a flowchart illustrating a process example (step S906) according to the present exemplary embodiment.

In step S1202, a worker who has cooperatively edited a target portion of the remaining work is extracted.

In step S1204, it is determined whether or not the worker can be extracted, and, in a case where the worker can be extracted, the process proceeds to step S1212, and, in other cases, the process proceeds to step S1206.

In step S1206, a worker who has edited a peripheral portion of the target portion is extracted.

In step S1208, it is determined whether or not the worker can be extracted, and, in a case where the worker can be extracted, the process proceeds to step S1212, and, in other cases, the process proceeds to step S1210.

In step S1210, workers in a connection state are extracted.

In step S1212, a worker by which an apparatus used is a desktop PC is extracted from among a plurality of extracted workers.

In the above example, a specific example will be described as follows.

(1) The remaining work "W-001" is "work of replacing the FIG. 1 with the latest version" from the remaining work table 1000. The person-in-charge-of-work determination module 140 acquires the user B and the user C as users who have frequent conversations with the user A during editing of the FIG. 1 from the editing history management module 110. The person-in-charge-of-work determination module 140 determines that the user C uses a smart phone and thus hardly edits the FIG. 1 on the basis of the client state detection module 130, and preferentially determines the user B using a desktop PC as a person in charge.

As other methods of allocating a person in charge, a person in charge excluding the person in charge of the remaining work from users who most frequently edits a region close to the FIG. 1 may be allocated.

The person-in-charge-of-work determination module 140 displays a coping request message on a terminal of the user B such that the user B performs the remaining work "W-001" as a substitute.

(2) A person in charge of the remaining work "W-002" is also the user A not in a connection state. The person-in-charge-of-work determination module 140 selects the user B as a user who has frequently coped from the editing history management module 110, and displays a coping request message, but the "user B" does not know a coping method, and thus rejects the coping request.

(3) Therefore, the person-in-charge-of-work determination module 140 refers to plan information (schedule) of the user A, and can understand that the user A is present in a base A. The user D who is connected from the same base A as the user A is determined as a person in charge among users in the current connection state. The user D verbally receives an instruction from the user A, and performs the remaining work "W-002".

As the plan information, for example, there is a schedule table 1500.

FIG. 15 is a diagram illustrating a data structure example of the schedule table 1500. The schedule table 1500 has a user field 1510, a date and time field 1520, a location field 1530, and a plan field 1540. The user field 1510 stores a user. The date and time field 1520 stores the date and time. The location field 1530 stores a location where the user is present at the date and time. The plan field 1540 stores a plan of the user at the date and time.

In step S908 in the flowchart illustrated in the example in FIG. 9, for example, a request screen 1300 is displayed to a new person in charge (user B).

FIG. 13 is a diagram illustrating a process example according to the present exemplary embodiment. A request sentence region 1310, a Yes button 1320, and a No button 1330 are displayed on the request screen 1300.

In the request sentence region 1310, for example, the following content is displayed. "Work request, to the user B, and I ask work "of replacing the FIG. 1 with the latest version" instead of the user A with respect to the document 400". The user B selects the Yes button 1320 or the No button 1330.

In step S912 in the flowchart illustrated in the example in FIG. 9, for example, a request screen 1400 is displayed to a new person in charge (user D).

FIG. 14 is a diagram illustrating a process example according to the present exemplary embodiment. A request sentence region 1410, a Yes button 1420, and a No button 1430 are displayed on the request screen 1400.

In the request sentence region 1410, for example, the following content is displayed. "Work request, to the user D, and I want you to talk with the user A present in the same base as the user D, and ask work "of replacing the FIG. 1 with the latest version" instead of the user A with respect to the document 400". The user D selects the Yes button 1420 or the No button 1430.

A hardware configuration of a computer executing a program as the present exemplary embodiment is a hardware configuration of a general computer as exemplified in FIG. 16, and the computer is, specifically, a personal computer or a computer serving as a server. In other words, as a specific example, a CPU 1601 is used as a processing unit (calculation unit), and a RAM 1602, a ROM 1603, and an HD 1604 are used as a storage device. For example, a hard disk or a solid state drive (SSD) may be used as the HD 1604. The computer includes the CPU 1601 executing programs such as editing history management module 110, the remaining work management module 120, the client state detection module 130, and the person-in-charge-of-work determination module 140; the RAM 1602 storing the programs or data; the ROM 1603 storing a program or the like for activing the computer; the HD 1604 which is an auxiliary storage device (which may be a flash memory or the like) storing documents, the editing history table 500, the remaining work table 1000, the connection state table 1100, and the schedule table 1500; a reception device 1606 which receives data on the basis of a user's operation (including an action, a voice, a visual line, and the like) on a keyboard, a mouse, a touch screen, a microphone, or a camera (including a visual line detection camera or the like); an output device 1605 such as a CRT, a liquid crystal display, or a speaker; a communication line interface 1607 for connection to a communication network such as a network interface card; and a bus 1608 connecting the above-described elements to each other for exchanging data. Such a plurality of computers may be connected to each other via a network.

Among the above-described exemplary embodiments, in a case of the exemplary embodiment based on a computer program, the computer program which is software is read to a system having the present hardware configuration, and the exemplary embodiment is realized through cooperation between the software and the hardware resources.

The hardware configuration illustrated in FIG. 16 corresponds to one configuration example, and the present exemplary embodiment is not limited to the configuration illustrated in FIG. 16, and any configuration in which the modules described in the present exemplary embodiment can be executed may be used. For example, some of the modules may be configured with dedicated hardware (for example, an application specific integrated circuit (ASIC)), some of the modules may be provided in an external system, and may be connected to a communication line, and such a plurality of systems illustrated in FIG. 16 may be connected to each other via a communication line so as to operate in cooperation therebetween. Particularly, the modules may be incorporated not only into a personal computer but also into a portable information communication apparatus (including a mobile phone, a smart phone, a mobile apparatus, a wearable computer, and the like), an information appliance, a robot, a copier, a facsimile, a scanner, a printer, a multi-function peripheral (an image processing apparatus having two or more functions of a scanner, a printer, copier, and a facsimile).

The program may be stored on a recording medium so as to be provided, and the program may be provided by using a communication unit. In this case, for example, the program may be understood as the invention of a "non-transitory computer readable medium storing the program".

The "non-transitory computer readable medium storing the program" indicates a computer readable recording medium storing the program, used to install, execute, and distribute the program.

The recording medium includes, for example, "a DVD-R, a DVD-RW, a DVD-RAM, or the like" which is a digital versatile disc (DVD) and is a standard defined in the DVD forum, and "a DVD+R, DVD+RW, or the like" which is a standard defined in the DVD+RW, a compact disc (CD) read only memory (CD-ROM), a CD recordable (CD-R), or a CD rewritable (CD-RW), a Blu-ray (registered trademark) disc, a magnetooptical disc (MO), a flexible disk (FD), a magnetic tape, a hard disk, a read only memory (ROM), an electrically erasable programmable read only memory (EEPROM) (registered trademark), a flash memory, a random access memory (RAM), and a secure digital (SD) memory card.

The whole or a part of the program may be recorded on the recording medium so as to be preserved or distributed. The program may be transmitted through communication, for example, by using a transmission medium such as a wired network used for a local area network (LAN), a metropolitan area network (MAN), a wide area network (WAN), the Internet, an intranet, or an extranet, a wireless communication network, or a combination thereof, and may be carried via a carrier wave mounted therewith.

The program may be apart or the whole of another program, or may be recorded on a recording medium along with a separate program. The program may be divided and recorded on a plurality of recording media. The program may be recorded in any restorable aspect such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a communication line interface, configured to connect a communication line;
    a storage device, configured to store a program, an editing history recording an editing time, an editing person, and an edited portion of the editing person performing editing work on portions of a document, and a usage history of a message function recording chatting persons who has used the message function and a chatting time of the chatting persons; and
    a processor, configured to execute the program to:
    determine whether a person in charge of the remaining work in a cooperative work logs into the information processing apparatus, and determine whether a user terminal of the person is not used or not connected to the communication line by using the communication line interface;
    in response to the person in charge of the remaining work not logging into the information processing apparatus or the user terminal of the person in charge of the remaining work being not used or not connected to the communication line, acquire the editing time of the person in charge of the remaining work from the editing history, acquire the chatting time of the chatting persons who chatted with the person in charge of the remaining work from the usage history, and compare the editing time of the person in charge of the remaining work with the chatting time of the chatting persons who chatted with the person in charge of the remaining work;
    extract the chatting person who participates in the cooperative work, has edited a portion corresponding to the remaining work along with the person in charge of the remaining work, and has used the message function with the person while the person was performing editing, as a worker; and
    send a message or an electronic email to the worker being extracted by using the communication line interface to request the worker to be in charge of the remaining work.

2. The information processing apparatus according to claim 1,
    wherein the processor extracts a worker using an apparatus appropriate to edit a document.

3. The information processing apparatus according to claim 1,
    wherein, in a case where the worker rejects the request from the request unit, the processor extracts a worker who is able to have a verbal meeting with the person in charge of the remaining work.

4. The information processing apparatus according to claim 3,
    wherein the processor extracts a worker who is present in a same base as a base of the person in charge of the remaining work.

5. The information processing apparatus according to claim 1,
    wherein the processor makes the request with a case where a predefined condition is satisfied as a trigger.

6. The information processing apparatus according to claim 5, wherein the predefined condition is a case where a predefined number of remaining days is reached, or a case where a current process is later than a planned process.

7. The information processing apparatus according to claim 6,
wherein the predefined number of remaining days is the number of days which is allocable to the remaining work in a schedule of the person in charge of the remaining work in a period up to a time limit of the remaining work.

8. A non-transitory computer readable medium storing an information processing program causing a computer to:
determine whether a person in charge of the remaining work in a cooperative work logs into the information processing apparatus, and determine whether a user terminal of the person is not used or not connected to a communication line by using a communication line interface;
in response to the person in charge of the remaining work not logging into the information processing apparatus or the user terminal of the person in charge of the remaining work being not used or not connected to the communication line, acquire the editing time of the person in charge of the remaining work from an editing history recording an editing time, an editing person, and an edited portion of the editing person performing editing work on portions of a document, acquire chatting time of chatting persons who chatted with the person in charge of the remaining work from a usage history of a message function recording chatting persons who has used the message function and a chatting time of the chatting persons, and compare the editing time of the person in charge of the remaining work with the chatting time of the chatting persons who chatted with the person in charge of the remaining work;
extract the chatting person who participates in the cooperative work, has edited a portion corresponding to remaining work along with the person in charge of the remaining work, and has used the message function with the person while the person was performing editing, as a worker and
send a message or an electronic email to the worker being extracted by using the communication line interface to request the worker to be in charge of the remaining work.

* * * * *